United States Patent
Goto

(10) Patent No.: US 9,631,915 B2
(45) Date of Patent: Apr. 25, 2017

(54) ARM TYPE THREE-DIMENSIONAL MEASURING MACHINE AND INCLINATION CORRECTION METHOD OF BASE PART FOR SUPPORTING ARM TYPE THREE-DIMENSIONAL MEASURING MACHINE

(71) Applicant: MITUTOYO CORPORATION, Kawasaki-shi, Kanagawa (JP)

(72) Inventor: Tomonori Goto, Sapporo (JP)

(73) Assignee: MITUTOYO CORPORATION, Kawasaki (JP)

( * ) Notice: Subject to any disclaimer, the term of this patent is extended or adjusted under 35 U.S.C. 154(b) by 112 days.

(21) Appl. No.: 14/523,138

(22) Filed: Oct. 24, 2014

(65) Prior Publication Data

US 2015/0113820 A1    Apr. 30, 2015

(30) Foreign Application Priority Data

Oct. 29, 2013 (JP) ................................. 2013-224756

(51) Int. Cl.
G01B 5/008 (2006.01)
G01B 21/04 (2006.01)

(52) U.S. Cl.
CPC .......... *G01B 5/008* (2013.01); *G01B 21/045* (2013.01)

(58) Field of Classification Search
CPC ........ G01B 5/008; G01B 7/008; G01B 21/04; G01B 21/042; G01B 21/045; G01B 2210/00; G01C 9/00
USPC ............................................. 33/503
See application file for complete search history.

(56) References Cited

U.S. PATENT DOCUMENTS

| | | | | |
|---|---|---|---|---|
| 5,210,954 A * | 5/1993 | Schafler | ................. | G01C 25/00 33/351 |
| 5,337,149 A * | 8/1994 | Kozah | .................. | G01C 15/002 356/139.03 |
| 5,440,492 A * | 8/1995 | Kozah | .................... | G01C 21/16 701/501 |
| 6,591,208 B2 * | 7/2003 | Lotze | ................... | G01B 21/045 702/152 |
| 7,467,061 B2 * | 12/2008 | Satoh | .................... | G06T 7/0028 702/150 |
| 7,805,851 B2 * | 10/2010 | Pettersson | .............. | G01B 5/008 33/503 |
| 2005/0151963 A1 * | 7/2005 | Pulla | ...................... | G01B 21/04 356/139.03 |
| 2016/0116275 A1 * | 4/2016 | Matsushita | .......... | G01B 21/042 702/95 |

FOREIGN PATENT DOCUMENTS

WO    WO 2011/090900 A1    7/2011

* cited by examiner

*Primary Examiner* — Richard A. Smith
(74) *Attorney, Agent, or Firm* — Oliff PLC

(57) ABSTRACT

An arm type three-dimensional measuring machine includes: a multi-jointed arm mechanism comprising a probe in a distal end; a processing part for computing a position of said probe; and an inclinometer configured to detect an inclination amount of a base part from a vertical direction in the base part for supporting the multi-jointed arm mechanism, wherein the processing part computes a position of the probe using the base part as a criterion and corrects the position of the probe using the base part as the criterion in a time-series manner based on an output from the inclinometer.

3 Claims, 4 Drawing Sheets

ARM TYPE THREE-DIMENSIONAL MEASURING MACHINE AND INCLINATION CORRECTION METHOD OF BASE PART FOR SUPPORTING ARM TYPE THREE-DIMENSIONAL MEASURING MACHINE

CROSS-REFERENCE TO RELATED APPLICATION(S)

This application is based upon and claims the benefit of priority from Japanese Patent Application No. 2013-224756, filed on Oct. 29, 2013, the entire contents of which are incorporated herein by reference.

BACKGROUND

1. Field of the Invention

The present invention relates to an arm type three-dimensional measuring machine and an inclination correction method of a base part for supporting the arm type three-dimensional measuring machine, and particularly to an arm type three-dimensional measuring machine capable of measuring work with high accuracy without stopping measurement even when an attitude of a multi-jointed arm mechanism is changed to incline a base part for supporting the multi-jointed arm mechanism during measurement of the work, and an inclination correction method of the base part for supporting the arm type three-dimensional measuring machine.

2. Description of the Related Art

An arm type three-dimensional measuring machine of manual operation as shown in WO2011/090900A1 is used conventionally. This arm type three-dimensional measuring machine has a multi-jointed arm mechanism including a probe in the distal end, and a processing part for computing a position of the probe. Also, this arm type three-dimensional measuring machine includes an inclinometer.

As a result, such an arm type three-dimensional measuring machine can evaluate, for example, the case where an installation place is unstable or the case where the arm type three-dimensional measuring machine is not installed properly by detecting an inclined state of the arm type three-dimensional measuring machine based on an output of the inclinometer.

The arm type three-dimensional measuring machine is often installed simply since it is easy to handle the measuring machine. That is, the arm type three-dimensional measuring machine is not necessarily installed in a stable state and in that case, a change in an attitude of a multi-jointed arm mechanism frequently changes a position of the center of gravity of the multi-jointed arm mechanism at the time of measurement, and a base part for supporting the multi-jointed arm mechanism may be inclined frequently. In that case, its inclination may cause an error in a position of a probe.

On the other hand, the arm type three-dimensional measuring machine of WO2011/090900A1 is configured to stop measurement in the case of deciding that the measuring machine is inclined and unstable by detecting an inclined state of the arm type three-dimensional measuring machine. That is, in the case of being inclined and unstable, the arm type three-dimensional measuring machine of WO2011/090900A1 cannot continue the measurement itself rather than making the measurement with high accuracy.

SUMMARY

An object of the invention is to provide an arm type three-dimensional measuring machine capable of measuring work with high accuracy without stopping measurement even when an attitude of a multi-jointed arm mechanism is changed to incline a base part for supporting the multi-jointed arm mechanism during measurement of the work, and an inclination correction method of the base part for supporting the arm type three-dimensional measuring machine.

According to the invention, there is provided an arm type three-dimensional measuring machine including: a multi-jointed arm mechanism comprising a probe in a distal end; a processing part for computing a position of said probe; and an inclinometer configured to detect an inclination amount of a base part from a vertical direction in the base part for supporting the multi-jointed arm mechanism, wherein the processing part computes a position of the probe using the base part as a criterion and corrects the position of the probe using the base part as the criterion in a time-series manner based on an output from the inclinometer.

In the invention, a time-series correction of a position of the probe using the base part as a criterion may be made by a coordinate transformation matrix, obtained from the inclination amount, between a gravity coordinate system using the vertical direction as a criterion and a base part coordinate system using the base part as the criterion.

In the invention, the base part may be supported by a tripod table.

According to the invention, there is provided an inclination correction method of a base part for supporting an arm type three-dimensional measuring machine having a multi-jointed arm mechanism comprising a probe in a distal end, and a processing part for computing a position of said probe, including: computing a position of the probe using the base part as a criterion; and correcting the position of the probe using the base part as the criterion in a time-series manner based on an inclination amount of the base part from a vertical direction.

According to the invention, work can be measured with high accuracy without stopping measurement even when an attitude of a multi-jointed arm mechanism is changed to incline a base part for supporting the multi-jointed arm mechanism during measurement of the work.

BRIEF DESCRIPTION OF THE DRAWINGS

The present invention will become more fully understood from the detailed description given hereinbelow and the accompanying drawing which is given by way of illustration only, and thus is not imitative of the present invention and wherein.

DETAILED DESCRIPTION OF THE INVENTION

One example of an embodiment of the invention will hereinafter be described in detail with reference to the drawings.

The embodiment according to the invention will be described using FIGS. 1 to 4.

First, a configuration of an arm type three-dimensional measuring machine 100 according to the present embodiment is described.

Figure 1:
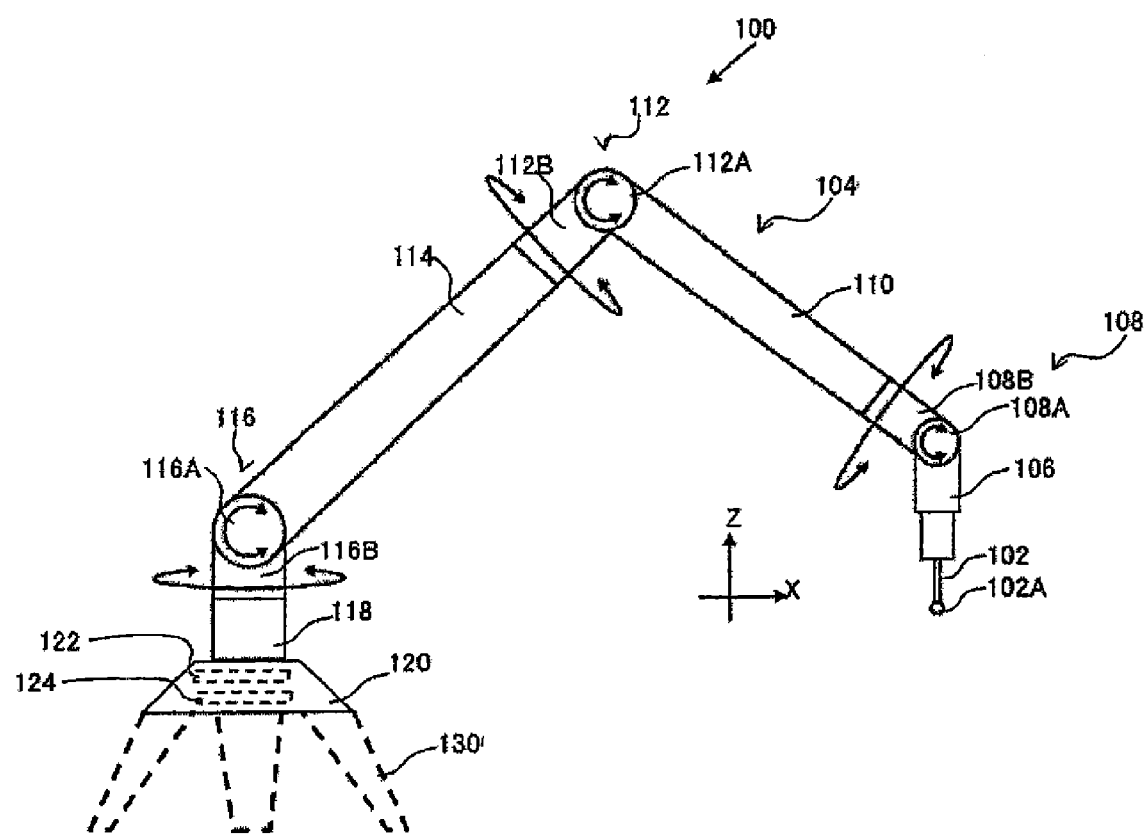
FIG. 1 is a schematic diagram showing one example of an arm type three-dimensional measuring machine according to an embodiment of the invention.

The arm type three-dimensional measuring machine 100 has a multi-jointed arm mechanism 104 and a processing part 122 as shown in FIG. 1. In addition, a processing device, a display device or an input device (not shown in the embodiment) may be connected to the arm type three-dimensional measuring machine 100. Also, when a three-dimensional shape of work W (not shown) is measured by the arm type three-dimensional measuring machine 100, a worker directly grips and operates a probe head 106 (FIG. 1). That is, the worker can bring a probe 102 near to the work W from a free direction and bring the probe 102 into contact with the work W at a free angle.

The multi-jointed arm mechanism 104 includes the probe 102 in the distal end as shown in FIG. 1. The multi-jointed arm mechanism 104 includes the probe head 106 for holding the probe 102, a first joint 108 for holding the probe head 106, a first arm 110 for supporting the first joint 108, a second joint 112 for supporting the first arm 110, a second arm 114 for supporting the second joint 112, a third joint 116 for supporting the second arm 114, and a strut 118 for supporting the third joint 116. And, the first joint 108, the second joint 112 and the third joint 116 are respectively formed rotatably in axial directions orthogonal mutually. In other words, encoders 108A, 108B are built into the first joint 108, and encoders 112A, 112B are built into the second joint 112, and encoders 116A, 116B are built into the third joint 116. Each of the encoders 108A, 108B, 112A, 112B, 116A, 116B has a rotary type capable of detecting a rotational angle (both arrows of solid lines shown in FIG. 1 show respective rotational directions). In other words, the axis (rotational axis) of the multi-jointed arm mechanism 104 of the embodiment is set at six axes (the axis of the multi-jointed arm mechanism 104 is not limited to the six axes and may be seven axes etc.). The strut 118 is erected perpendicularly to a base part 120 directly arranged on a work table etc. on which the work W (not shown) is placed (a broken line of FIG. 1 shows a tripod table 130, and the multi-jointed arm mechanism 104 is arranged on the work table etc. through the tripod table 130). In other words, the base part 120 supports the multi-jointed arm mechanism 104. The probe 102 is a contact type ball probe in which the tip (probe tip) 102A has a ball shape.

Figure 2:
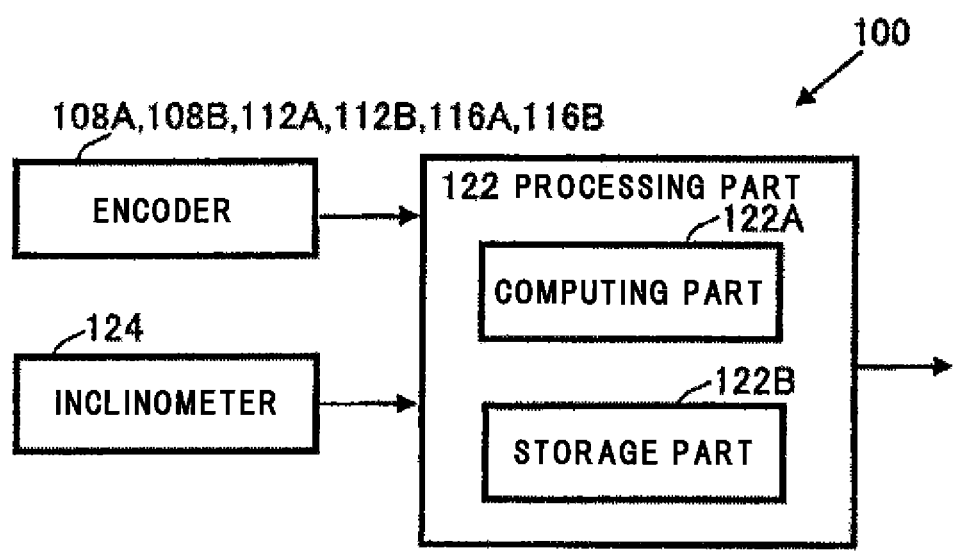
FIG. 2 is a schematic diagram showing one example of a configuration block of FIG. 1.

As shown in FIG. 1, the processing part 122 is included in the base part 120 together with an inclinometer 124 (the processing part 122 is not limited to this, and may be formed in the outside of the arm type three-dimensional measuring machine 100). As shown in FIG. 2, the processing part 122 has a computing part 122A and a storage part 122B. In other words, the processing part 122 can store a result computed by the computing part 122A in the storage part 122B, or can read out data stored in the storage part 122B and compute the data by the computing part 122A. The processing part 122 is connected to the encoders 108A, 108B, 112A, 112B, 116A, 116B and the inclinometer 124. Here, a positional relation and lengths of the probe 102, the multi-jointed arm mechanism 104 and the base part 120 are previously clarified. And, since a shape of a ball of the probe tip 102A of the probe 102 is clarified, a position of contact between the ball and the work W can accurately be measured by performing offset processing for a radius of the ball with respect to a central coordinate value of this ball. In other words, the processing part 122 accurately computes a position of (the probe tip 102A of) the probe 102 (using the base part 120 as a criterion) based on outputs of the encoders 108A, 108B, 112A, 112B, 116A, 116B built into the first to third joints 108, 112, 116. At this time, a matrix M indicating a position of the probe tip 102A is expressed by Formula (1) using a coordinate transformation matrix $M_k^{k+1}$ (k=base, 1 to 6, end) in each rotational axis since the arm type three-dimensional measuring machine 100 has the multi-jointed arm mechanism 104 of the six axes.

[Mathematical Formula 1]

$$M = M_{base}^1 \cdot M_1^2 \cdot M_2^3 \cdot M_3^4 \cdot M_4^5 \cdot M_5^6 M_6^{end} \quad (1)$$

In addition, the symbol $M_{base}^1$ indicates a coordinate transformation matrix between the base part 120 used as a criterion of a coordinate system determined on a base surface and the rotational axis of the encoder 116B used as the first rotational axis, and the symbol $M_6^{end}$ indicates a coordinate transformation matrix between the probe tip 102A and the rotational axis of the encoder 108A used as the sixth axis of the multi-jointed arm mechanism 104, respectively.

Figure 3:
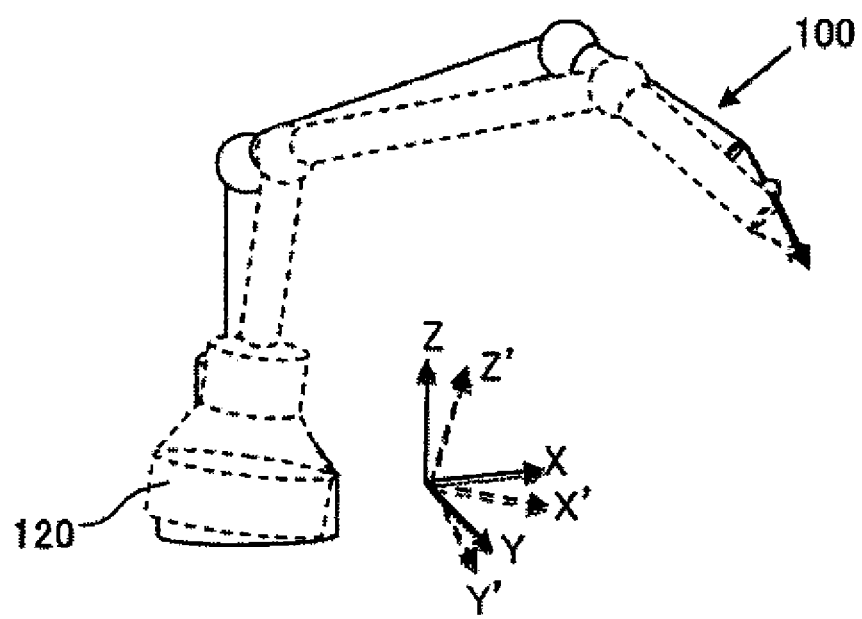
FIG. 3 is a schematic diagram showing one example of a state in which a base part for supporting the arm type three-dimensional measuring machine is inclined.

In addition, the inclinometer 124, for example, does not output a signal since it is in a state (state of the arm type three-dimensional measuring machine 100 depicted by a solid line) in which the base part 120 is not inclined when an XYZ coordinate system (a gravity coordinate system) using a vertical direction (Z direction) as a criterion matches with an X'Y'Z' coordinate system (a base part coordinate system=a coordinate system determined on the base surface) using the base part 120 as a criterion as shown in FIG. 3. The inclinometer 124, for example, outputs a signal according to the inclination amount since it is in a state (state of the arm type three-dimensional measuring machine 100 depicted by a broken line) in which the base part 120 is inclined when the XYZ coordinate system does not match with the X'Y'Z' coordinate system. That is, the inclinometer 124 is configured to detect the inclination amount (two axial directions) of the base part 120 from the vertical direction. As a result, even when the base part 120 used as the criterion of the coordinate system determined on the base surface becomes inclined, the processing part 122 can accurately obtain a position of the probe tip 102A by accurately computing the position of the probe tip 102A using the base part 120 as the criterion and correcting its result in a time-series manner based on an output from the inclinometer 124 (in addition, in the time-series correction, the computed positions of the probe tip 102A may be sequentially corrected, or the positions of the probe tip 102A may be collectively corrected after the outputs from the inclinometer 124 are sequentially stored to compute all the positions of the probe tip 102A.). Here, when a coordinate transformation matrix indicating an inclination of the base part 120 is expressed by the symbol $M_{gravity}^{base}$, a matrix $M_{true}$ indicating the corrected position of the probe tip 102A is expressed by Formula (2) using a coordinate transformation matrix $M_k^{k+1}$ (k=base, 1 to 6, end) in each rotational axis.

$$M\text{true} = M_{gravity}^{base} \cdot M_{base}^1 \cdot M_1^2 \cdot M_2^3 \cdot M_3^4 \cdot M_4^5 \cdot M_5^6 \cdot M_6^{end} \quad [\text{Mathematical Formula 2}]$$

$$M\text{true} = M_{gravity}^{base} \cdot M \quad (2)$$

The processing part 122 computes a position of the probe 102 in a time-series manner every time the position of the probe 102 is changed. Or, the position of the probe 102 is computed in a time-series manner with a certain period.

Figure 4:
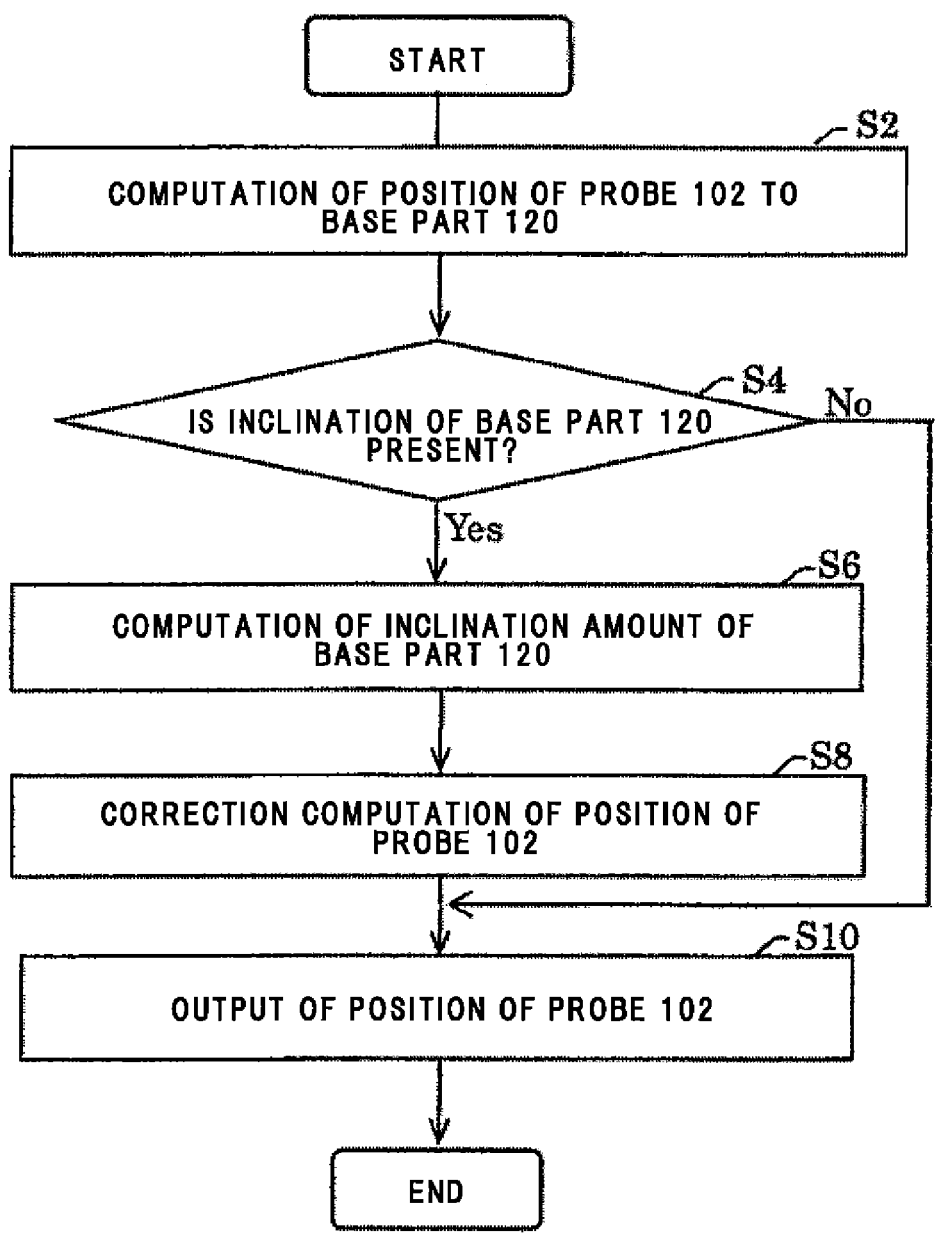
FIG. 4 is a flowchart showing one example of a procedure of processing performed by a processing part.

Next, one example of a procedure of processing performed by the processing part 122 in the arm type three-dimensional measuring machine 100 of the embodiment will hereinafter be described using FIG. 4.

First, coordinates of a predetermined position in work W are measured in the probe tip 102A, and a position of the probe 102 using the base part 120 as a criterion is computed (step S2). That is, the computing part 122A computes the position of the probe 102 using Formula (1) based on an output of each of the encoders 108A, 108B, 112A, 112B, 116A, 116B, and its result is temporarily stored in the storage part 122B.

Next, the presence or absence of an inclination of the base part 120 is decided (step S4). Concretely, the computing part 122A decides the presence or absence of an output of the inclinometer 124. The output of this inclinometer 124 can be produced simultaneously when an output of each of the encoders 108A, 108B, 112A, 112B, 116A, 116B is produced. When the output of the inclinometer 124 is absent (No in step S4), the obtained position of the probe 102 using the base part 120 as the criterion is outputted as it is from the processing part 122 (step S10).

When the output of the inclinometer 124 is present (Yes in step S4), the computing part 122A computes an inclination amount of the base part 120 based on the output of the inclinometer 124 (step S6). Then, the symbol $M_{gravity}^{base}$ is obtained. Then, a correction computation of the position of the probe 102 is performed (step S8). Concretely, the position of the probe 102 using the base part 120 as the criterion is read out of the storage part 122B, and the position of the probe 102 expressed by Formula (2) is obtained using a value of the symbol $M_{gravity}^{base}$. That is, the processing part 122 corrects the position of the probe 102 using the base part 120 as the criterion in a time-series manner based on the output from the inclinometer 124. Then, the position of its probe 102 is outputted from the processing part 122 (step S10).

Thus, the embodiment includes the inclinometer 124 for detecting the inclination amount of the base part 120 from the vertical direction in the base part 120 for supporting the multi-jointed arm mechanism 104. Then, the processing part 122 makes a time-series correction in a position of the probe 102 of the gravity coordinate system using the vertical direction as the criterion based on the output from the inclinometer 124. That is, even when the base part 120 is inclined during measurement, the computation of the position of the probe 102 is continued regardless of an inclined state of the base part 120.

Then, when the base part 120 is inclined, the position of the probe 102 is corrected and computed to the gravity coordinate system using the vertical direction as the criterion based on the output from the inclinometer 124, with the result that the position of the probe 102 can be corrected accurately and speedily. Concretely, a position of the probe 102 using the base part 120 as the criterion is first computed in the Y'Z' coordinate system. Next, a coordinate transformation matrix $M_{gravity}^{base}$ between the XYZ coordinate system and the X'Y'Z' coordinate system is obtained from the inclination amount which is the output of the inclinometer 124, and by its coordinate transformation matrix $M_{gravity}^{base}$, a time-series correction of the position of the probe 102 using the base part 120 as the criterion is made to compute a position of the probe 102 in the XYZ coordinate system using the vertical direction as the criterion. Accordingly, the position of the probe 102 using the base part 120 as the criterion can be corrected in real time by the inclination amount of the base part 120 changeable by an attitude of the multi-jointed arm mechanism 104, and high-accuracy measurement can be made.

In addition, the embodiment described above focuses attention on only the inclination of the base part 120, but the arm type three-dimensional measuring machine 100 may involve displacement (parallel translation) as well as the inclination of the base part 120 by the influence of an external force from a worker or the attitude of the multi-jointed arm mechanism 104. However, the embodiment does not consider the influence of displacement since a change by the inclination generally has a greater influence on measurement accuracy and the displacement is small when the base part 120 is fixed as necessary. Of course, the base part 120 may be provided with a displacement meter in addition to the inclinometer 124 to detect the displacement together with the inclination. In that case, the position of the probe 102 can be corrected with higher accuracy.

That is, the embodiment can measure the work W with high accuracy without stopping measurement even when an attitude of the multi-jointed arm mechanism 104 is changed to incline the base part 120 for supporting the multi-jointed arm mechanism 104 during measurement of the work W.

The invention has been described by giving the embodiment described above, but the invention is not limited to the embodiment described above. That is, it goes without saying that improvements and design changes can be made without departing from the gist of the invention.

For example, in the embodiment described above, the probe 102 is the ball probe as shown in FIG. 1, but the invention is not limited to this ball probe. For example, the probe 102 may be a contact type probe such as a touch signal probe. Or, the probe 102 may be, for example, a non-contact type probe using a line laser etc.

Also, the embodiment described above assumes that the base part 120 is directly arranged on a work table etc., but the base part 120 of FIG. 1 may be supported by the tripod table 130 as shown by a broken line of FIG. 1. In that case, the arm type three-dimensional measuring machine 100 can be arranged without being influenced by a state of space among three legs by only forming regions of only the tops of the three legs in the work table.

Also, the embodiment described above decides the presence or absence of an inclination of the base part 120 by the presence or absence of an output of the inclinometer 124, but the invention is not limited to this, and the presence or absence of the inclination of the base part 120 may be decided by, for example, a change in an output state of the inclinometer 124.

The invention can be widely applied to an arm type three-dimensional measuring machine having a multi-jointed arm mechanism including a probe in the distal end, and a processing part for computing a position of the probe.

What is claimed is:

1. An arm type three-dimensional measuring machine comprising:

a multi-jointed arm mechanism comprising a probe in a distal end;

a processing part for computing a position of said probe; and an inclinometer configured to detect an inclination amount of a base part from a vertical direction in the base part for supporting the multi-jointed arm mechanism, wherein the processing part computes a position of the probe using the base part as a criterion and corrects the position of the probe using the base part as the criterion in a time-series manner based on an output from the inclinometer, wherein a time-series correction of a position of the probe using the base part as a criterion is made by a coordinate transformation matrix, obtained from the inclination amount, between a gravity coordinate system using the vertical direction as a criterion and a base part coordinate system using the base part as the criterion.

2. An arm type three-dimensional measuring machine according to claim 1, wherein
the base part is supported by a tripod table.

3. An inclination correction method of a base part for supporting an arm type three-dimensional measuring machine having a multi-jointed arm mechanism comprising a probe in a distal end, and a processing part for computing a position of said probe, comprising:
computing a position of the probe using the base part as a criterion;
correcting the position of the probe using the base part as the criterion in a time-series manner based on an inclination amount of the base part from a vertical direction; and
performing a time-series correction of a position of the probe using the base part as a criterion using a coordinate transformation matrix, obtained from the inclination amount, between a gravity coordinate system using the vertical direction as a criterion and a base part coordinate system using the base part as the criterion.

* * * * *